United States Patent
Scommegna et al.

(10) Patent No.: US 11,648,093 B2
(45) Date of Patent: May 16, 2023

(54) MANDIBULAR ADVANCEMENT DEVICE AND PROCEDURE FOR THE REALIZATION OF SUCH DEVICE

(71) Applicant: LEONE S.P.A., Sesto Fiorentino (IT)

(72) Inventors: Gabriele Scommegna, Tavernuzze Impruneta (IT); Maurizio Dolfi, Florence (IT)

(73) Assignee: LEONE S P A., Sesto Fiorentino (IT)

( * ) Notice: Subject to any disclaimer, the term of this patent is extended or adjusted under 35 U.S.C. 154(b) by 270 days.

(21) Appl. No.: 16/964,344

(22) PCT Filed: May 2, 2019

(86) PCT No.: PCT/IT2019/050090
§ 371 (c)(1),
(2) Date: Jul. 23, 2020

(87) PCT Pub. No.: WO2019/215769
PCT Pub. Date: Nov. 14, 2019

(65) Prior Publication Data
US 2021/0045848 A1 Feb. 18, 2021

(30) Foreign Application Priority Data
May 8, 2018 (IT) .................. 102018000005167

(51) Int. Cl.
*A61C 7/36* (2006.01)
(52) U.S. Cl.
CPC ............ *A61C 7/36* (2013.01); *A61C 2201/00* (2013.01)

(58) Field of Classification Search
CPC ......... A61C 7/36; A61C 17/10; A61C 8/0036; F16B 7/14; F16B 7/1445;
(Continued)

(56) References Cited

U.S. PATENT DOCUMENTS

| | | |
|---|---|---|
| 5,879,157 A | 3/1999 | Scheu |
| 6,004,323 A | 12/1999 | Park et al. |

(Continued)

FOREIGN PATENT DOCUMENTS

| | | |
|---|---|---|
| GB | 1 049 331 A | 11/1966 |
| WO | 2018/074307 A1 | 4/2018 |

OTHER PUBLICATIONS

International Search Report and Written Opinion of the International Searching Authority dated Jul. 3, 2019 in corresponding International application No. PCT/IT2019/050090; 9 pages.

*Primary Examiner* — Matthew M Nelson
*Assistant Examiner* — Drew S Folgmann
(74) *Attorney, Agent, or Firm* — Maier & Maier, PLLC

(57) ABSTRACT

A device for mandibular advancement, including a tube and a telescopic rod associated with the tube, in which the tube and the telescopic rod can be associated to the teeth of the upper and lower arches, in which the telescopic rod includes a threaded pin which engages a female thread of a hollow element slidably positioned in said tube, and the hollow element includes a maneuvering portion external to the tube; the device includes a friction element, arranged between the inner walls of the maneuvering portion and the thread of the pin and having an outer surface which is complementary to the inner walls of said maneuvering portion and a threaded internal cavity which copies the thread of the pin.

9 Claims, 4 Drawing Sheets

(58) Field of Classification Search
CPC .......... Y10T 403/32491; A61B 17/663; A61B 17/68; A61B 17/56; A61F 5/566; Y10S 602/902

See application file for complete search history.

(56) References Cited

U.S. PATENT DOCUMENTS

2007/0105062 A1    5/2007  Forster
2020/0046466 A1*   2/2020  Yukita ..................... A61C 7/08

* cited by examiner

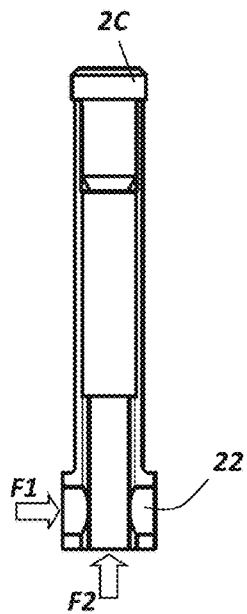
*FIG. 4*
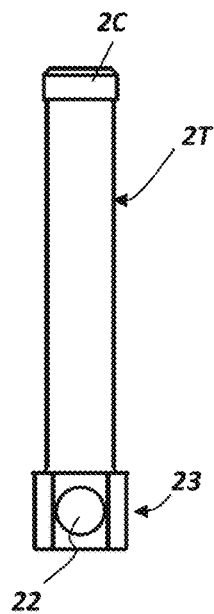
*FIG. 5*
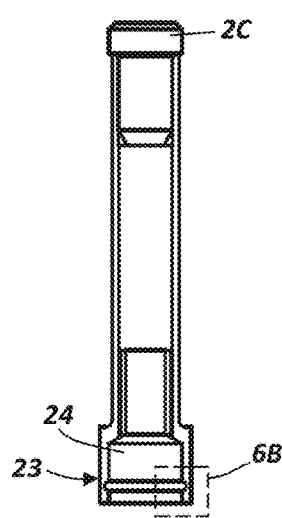
*FIG. 6A*
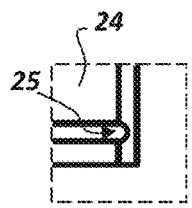
*FIG. 6B*
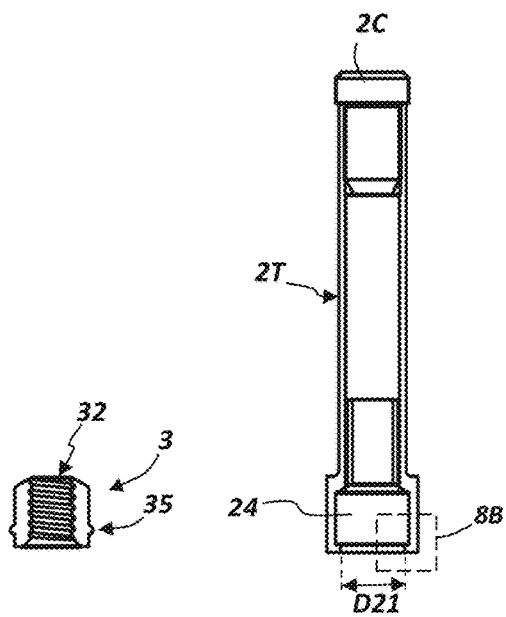
*FIG. 7*     *FIG. 8A*
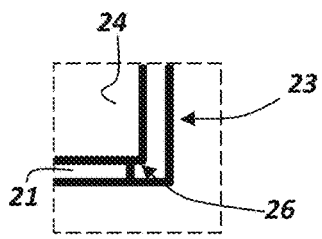
*FIG. 8B*
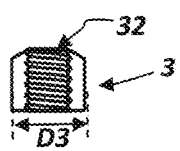
*FIG. 9*

MANDIBULAR ADVANCEMENT DEVICE AND PROCEDURE FOR THE REALIZATION OF SUCH DEVICE

FIELD

The present invention relates to a device for mandibular advancement, of the type generally known as "Herbst apparatus" and the relative manufacturing process.

BACKGROUND

It is known that a device of the type indicated above consists substantially of a tube in which a telescopic rod is slidably positioned. The tube and the rod are intended to be fixed with their respective free ends, by means of special joints, to the upper and the lower jaw of the patient undergoing treatment. This device forces the mandible, and with it the mandibular teeth, to move forward.

An apparatus of the type indicated above is described in U.S. Pat. No. 5,879,157. With reference to FIG. 1 of the attached drawings, in a possible embodiment this apparatus comprises a first external tube (EST) with a respective first anchoring eyelet (AE) and a second tube (INT) able to slide longitudinally in the external tube (EST). The second tube (INT) has a maneuvering portion (MP) formed by a ring with an internal nut threading engaged by a threaded rod (TA) which, on the opposite side, has a corresponding second anchoring eyelet (AR). Said maneuvering portion has radial holes (MH) in which it is possible to insert a pin to cause its rotation and, in this way, to adjust the distance between the eyelets (AE, AR). The connection between the portion integral with the first eyelet (AE) and the portion integral with the second eyelet (AR) is therefore determined by the screwing of the threaded rod (TA), which is integral with the second eyelet (AR), with the maneuvering portion (MP) which is fixed to the tube (INT) resulting rotatably idle with respect to the latter so as to allow variations in the distance between the aforesaid eyelets (AR, AE) even when the eyelets are fixed to form the orthodontic apparatus.

A drawback deriving from the realization of this connection lies in the fact that an undesirable unscrewing between the threaded rod (TA) and the maneuvering portion (MP) is possible, and said unscrewing could compromise the effectiveness of the orthodontic treatment.

An attempt to solve this problem is done through the use of the so-called "thread-locker", i.e. a material that increases the friction between the thread of the rod and the maneuvering portion. This attempt at solution does not guarantee effective or constant effects; in fact, the thread-locker may be unstable at temperatures of 30-40° C., furthermore it may fragment and/or pulverize decreasing or canceling its effectiveness.

A further drawback related to the use of the thread locker is related to the reduction of braking effectiveness during repeated maneuvers carried out.

SUMMARY

The main object of the present invention is to eliminate the aforementioned drawbacks and to propose a device for advancing the lower jaw and a relative manufacturing process capable of combining simplicity and constructive economy with reliability and safety in prolonged use over time.

This result has been achieved, in accordance with the present invention, by adopting the idea of realizing a device and a process having the characteristics indicated in the independent claims. Other innovative features are described in the dependent claims.

Among the advantages offered by the present invention, in addition to obtaining a Herbst device capable of maintaining the coupling between its parts in a correct and effective manner, the following are to be highlighted: the constructive simplicity and, therefore, also the relatively low cost; reliability; accuracy; the possibility of using biocompatible materials of the type normally used for the construction of intraoral equipment.

BRIEF DESCRIPTION OF THE DRAWINGS

These and further advantages and features of the present invention will be more and better understood by every person skilled in the art thanks to the following description and the attached drawings, provided as an example but not to be considered in a limiting sense, in which:

FIG. 4 is a side view in which the device is partially sectioned and is represented by a view similar to that of FIG. 3;

FIG. 5 is a side view rotated 90° with respect to that of FIG. 4;

FIG. 6A represents the device of FIGS. 2-5, partially represented as in FIGS. 4 and 5, in section;

FIG. 6B is an enlarged detail of the portion labeled "6B" in FIG. 6A, highlighting a possible embodiment of a seat for receiving a resin or acrylic composite element in accordance with the invention;

FIG. 7 is a schematic longitudinal section view of a possible example of embodiment of the resin or acrylic composite element in accordance with the invention;

FIG. 8A represents the device of FIGS. 2-5, in a similar way to FIG. 6, in section;

FIG. 8B is an enlarged detail of the portion labeled "8B" in FIG. 8A, highlighting another possible embodiment of the seat for receiving the resin element or in acrylic composite in accordance with the invention;

FIG. 9 is a schematic longitudinal section view of another possible embodiment of the resin element or of acrylic composite according to the invention;

DETAILED DESCRIPTION OF THE EMBODIMENTS

Figure 1:
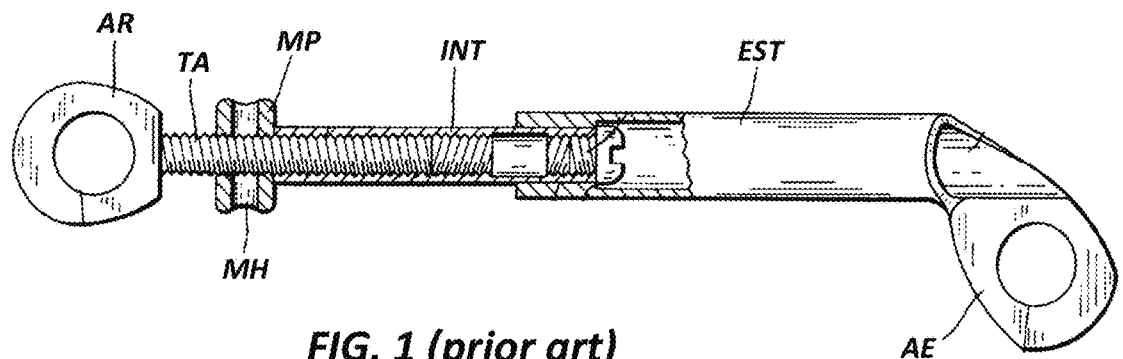
FIG. 1 shows a partially sectioned side view of a known Herbst type apparatus, constituting the "prior art"
Figure 2:
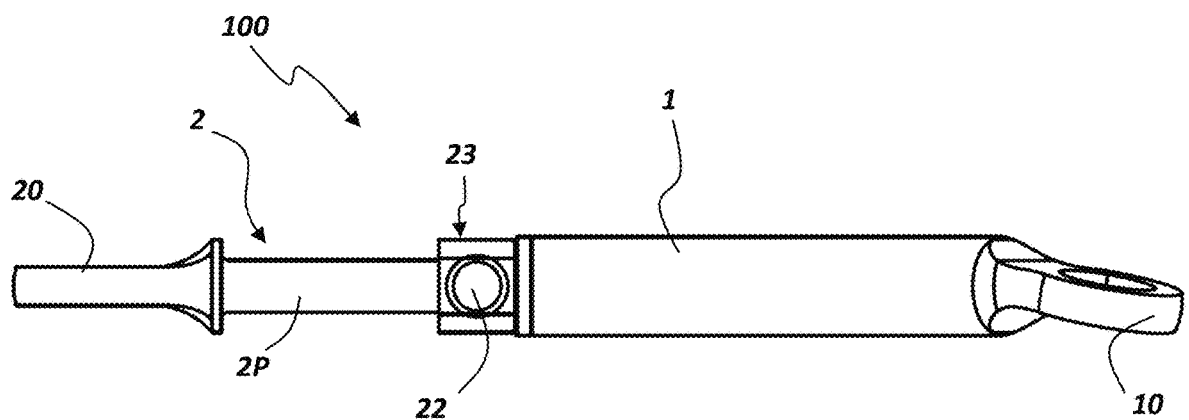
FIG. 2 represents a first side view with respect to a possible embodiment of a device according to the invention.
Figure 3A:
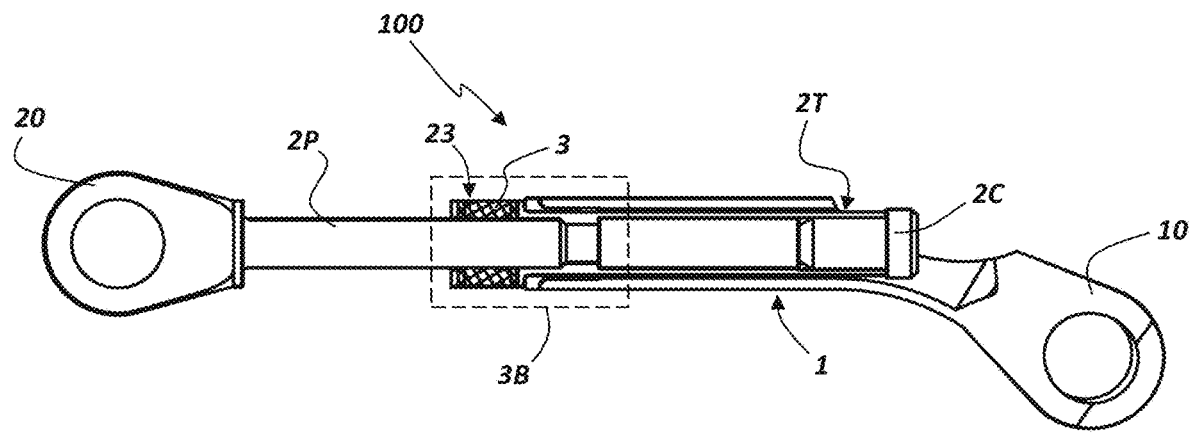
FIG. 3A represents a second side view, rotated 90° with respect to that of FIG. 2, and partially sectioned.
Figure 3B:
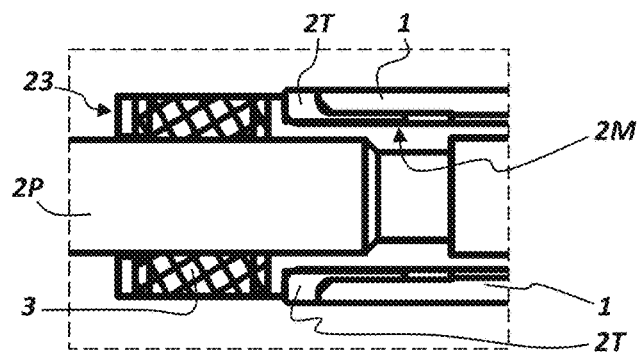
FIG. 3B is an enlarged detail of the portion labeled "3B" in FIG. 3A.

Reduced to its essential structure and with reference to the figures of the attached drawings, a device (100) for advancing the lower jaw according to the present invention is a telescopic element comprising a tube (1) in which a telescopic rod (2) is placed. The tube (1) and the rod (2) are able to be connected with the respective free ends to the same side, right or left, of the upper dental arch and of the lower dental arch of the patient subjected to the treatment according to a known procedure and therefore not shown in the drawings. More specifically, the free end of the tube (1) and the free end of the rod (2) are provided with respective eyelets (10, 20), oriented with predetermined angles relative to the longitudinal axes of the tube (1) and respectively of the rod (2). The eyelets (10, 20) can be used, in a known manner, to constrain the device to an orthodontic apparatus comprising two caps or bites anatomically shaped to be fitted onto the dental arches by means of corresponding fixing screws as provided by the known art, which further provides for mounting on the screws corresponding pins provided with metal wires intended to be incorporated into the material of the respective caps to ensure a more convenient anchorage. The application using the caps allows the user to have a removable device that can be used during sleep with an anti-snoring function.

It is understood, however, that the tube (1) and the rod (2) can be anchored in any other way to the dental arches depending on the specific treatment decided by the doctor. The methods of application of the device to the dental arches can be therefore several and not binding for the purposes of the present invention.

The telescopic rod (2) comprises a hollow element (2T) dimensioned and shaped to be able to slide in the tube (1) and a threaded pin (2P) whose external thread engages a female thread (2M) arranged inside the hollow element (2T). Therefore, the hollow element (2T) of the telescopic rod (2) can slide inside the tube (1) and can be screwed onto the pin (2P). The latter, on the opposite side to that which engages the hollow element (2T), is equipped with the aforementioned eyelet (20). The hollow element (2T) is provided with a cap (2C) which in the maximum extension of the device defines the maximum stroke, interfering with a stop set in the tube (1) on the opposite side to the respective eyelet (10). Said hollow element (2T) has a maneuvering portion (23) having a transversal dimension greater than the internal diameter of the tube (1) so as to be external to the latter whatever the position of the same element (2T) inside the tube (1).

Said maneuvering portion (23) is provided with two opposite holes (22), each of which defines a seat for a maneuvering key i.e. for an instrument suitable to be inserted in the hole (22) to rotate the maneuvering portion (23) and thus determine the screwing (or unscrewing) of the pin (2P) with respect to the hollow element (2T).

According to the present invention, inside the maneuvering portion (23), a friction element (3) is stably housed. In particular, the friction element (3) can be made of resin (for example thermoplastic resin POM or polyamide PA), or in a photo-polymerizable acrylic composite. For the construction of the element (3) the composite named Light Cure Composite F3171-01 by Leone SpA can be used, for example; obviously, this choice is not limited to others. The friction element (3) copies the profile of the thread of the pin (2P) so determining a considerable increase in friction. In practice, the friction element (3) is provided with an internal threaded cavity (32) which adheres to the thread of the pin (2P) and of an external surface that adheres to the internal walls (24) of the maneuvering portion (23).

The friction element (3) can be pre-formed and inserted during the assembly of the device (100).

In the case of pre-formation of the friction element (3), relatively elastic materials such as polyoxymethylene (POM), polyamide (PA) or polyaryletherketone (PEK) or polypropylene (PP) may be preferred.

Independently of the production process of the friction element (3), the conformation of the same element (3) can advantageously be carried out according to characteristics suitable to provide advantages from the structural and functional point of view, i.e. suitable to provide a good mechanical resistance and a high resistance against undesired unscrewing.

FIG. 7 shows an embodiment of the friction element (3) usable in combination with a maneuvering portion (23) such as that shown in FIG. 6. In this case, the inner walls (24) of the maneuvering portion (23) are provided with a circumferential groove (25) defining a recess which firmly blocks the friction element (3) which is in turn provided with a corresponding circular molding (35) which is inserted into the said groove (25).

FIG. 9 shows an embodiment of the friction element (3) usable in combination with a maneuvering portion (23) such as that shown in FIG. 8. In this case, the inner walls (24) of the maneuvering portion (23) are provided with a step (26) which determines the reduction of the internal diameter of said maneuvering portion (23). In practice, inside the maneuvering portion (23) there is a portion (24) with a larger diameter and a portion (21) with a smaller diameter (D21), arranged below in the drawing of FIG. 8 and delimited by the step (26). The friction element (3) is shaped with a diameter (D3) corresponding to the diameter of the portion (24) or greater than that (D21) of the portion (21). In this way, the element (3) is blocked by the step (26) inside the maneuvering portion (23). Also in this case the element (3) is provided with an internal threaded cavity (32) which adheres to the thread of the pin (2P).

Figure 10:
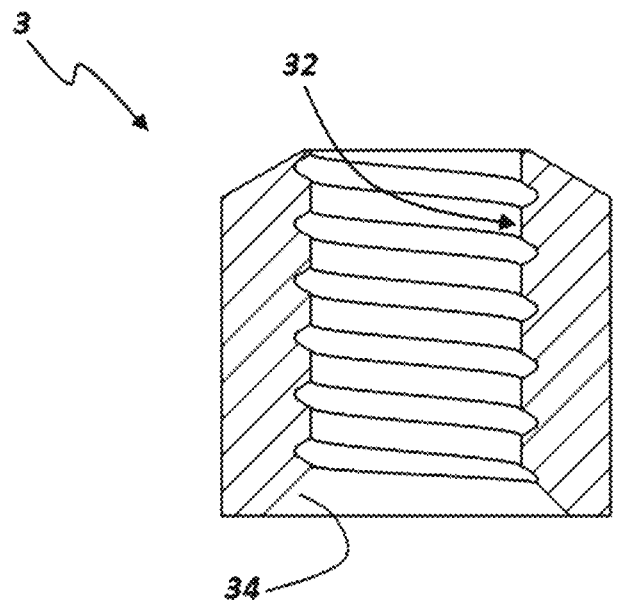
FIG. 10 is a schematic view in longitudinal section of another possible embodiment of the resin element or in acrylic composite in accordance with the invention.

The embodiment of the friction element (3) shown in FIG. 10 is similar to that of FIG. 9. In this case, the internal threaded cavity (32) of the element (3) has a lower portion (34) slightly countersunk.

Figure 11:
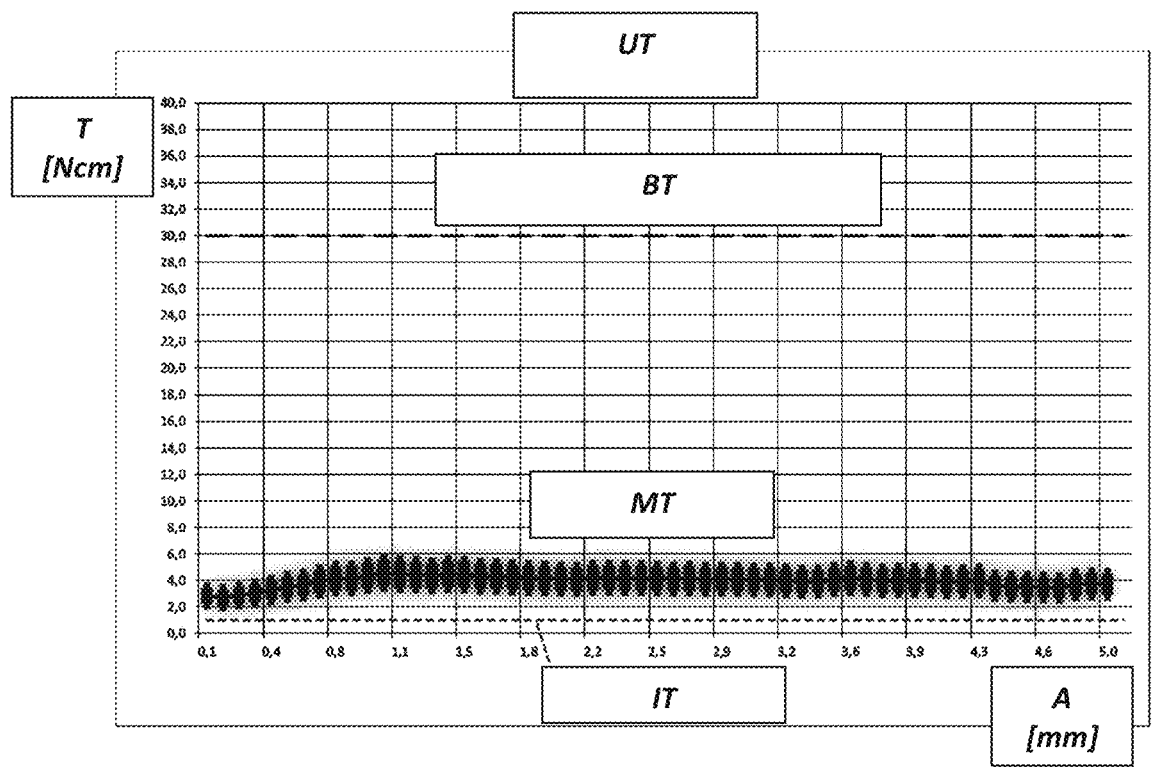
FIG. 11 is a diagram showing the trend of the torque required for unscrewing in relation to the activation values.

Experimental tests conducted by the applicant have shown that the unscrewing torque determined by the friction element (3) has a value of 1-10 Ncm, preferably between 2 and 5 Ncmm, as shown in the graph of FIG. 11.

Moreover, the pitch and inclination of the thread can be differentiated with respect to the corresponding pitch and inclination values of the thread of the pin (2P). In this way it is possible to graduate the friction value determined by the same element (3).

The graph of FIG. 11 shows the trend of the unscrewing force (UT) in the experimental tests performed. In particular, the value (T) of the torque in Ncm is indicated on the ordinate axis and the value in mm of activation (A) is indicated on the abscissa axis. In the graph the values are indicated with abbreviations; (UT) indicates the unscrewing torque, (MT) indicates the measured torque, (BT) indicates the breaking torque of the screw subjected to torsion, (IT) indicates insufficient torque. In practice, the graph represents the values of the activation torque obtained by means of the friction element of the present invention. The graph shows an upper limit (BT) corresponding to the torsional resistance of the threaded pin (2P) and a lower limit (IT) corresponding to the ineffectiveness of the friction.

With the use of the friction element (3) a sufficient torque is guaranteed to prevent undesired unscrewing for all the activation values.

In practice, the friction element (3) acts in all the configurations assumed by the device (100), that is in all the configurations determined by the screwing of the threaded pin (2P) in the female thread (2M) of the hollow element (2T), eliminating the possibility of undesired unscrewing of the threaded pin (2P).

Furthermore, the hardness of the light-curing composite is quantifiable in a value between 80 and 90 Shore D, in particular between 82 and 85 Shore D.

It goes without saying that all the components of the device in question are made of biocompatible materials.

Therefore, object of the present invention is a device (100) for mandibular advancement, comprising a tube (1) and a telescopic rod (2) associated with the tube (1), in which the tube (1) and the telescopic rod (2) can be associated with the teeth of the upper and lower arches, in which the telescopic rod (2) comprises a threaded pin (2P) which engages a female thread (2M) of a hollow element (2T) slidably positioned in said tube (1), and in which the said hollow element (2T) comprises a maneuvering portion (23) external to the tube (1), characterized in that the device (100) comprises a friction element (3), arranged between the internal walls (24) of said maneuvering portion and the thread of the pin (2P) and having an external surface complementarily shaped with respect to the inner walls (24) of said maneuvering portion and a threaded internal cavity (32) which copies the thread of the pin (2P).

In the description and in the figures of the accompanying drawings, the internal walls (24) of said maneuvering portion (23) are provided with a groove (25) and said friction element (3) is provided with a corresponding moulding (35) firmly insertable in said groove (25). Moreover, the internal walls (24) of said maneuvering portion (23) have a portion (21) of reduced diameter (D21) and said friction element (3) has a diameter (D3) greater than said reduced diameter (D21).

The friction element (3) is preferably made of a material of the group which comprises: plastic material, resin, photo-polymerizable material, self-polymering material, chemically activatable material.

Still with reference to the examples of the attached figures, the friction element (3) has an internal thread (32) shaped so as to be compatible with said thread of the pin (2P) but with pitch and/or inclination of the thread differentiated with respect to the corresponding pitch and inclination values of the thread of the pin (2P).

A process according to the present invention can be used for making a device (100) for mandibular advancement, comprising a tube (1) and a telescopic rod (2) associated with the tube (1), in which the tube (1) and the telescopic rod (2) can be associated with the teeth of the upper and lower arches, in which the telescopic rod (2) comprises a threaded pin (2P) which engages a female thread (2M) of a hollow element (2T) slidably positioned in said tube (1), and in which said hollow element (2T) comprises a maneuvering portion (23) external to the tube (1). The method provides a friction element (3), arranged between the inner walls (24) of said maneuvering portion and the thread of the pin (2P) and having an external surface complementarily shaped with respect to the internal walls (24) of said maneuvering portion and a threaded internal cavity (32) which copies the thread of the pin (2P).

With reference to the examples, the method provides for using a material of the group which comprises: plastic material, resin, photo-polymerizable material, self-polymerizing material, chemically activatable material. Moreover, the method provides for initially forming the components of the device (100) and the said friction element (3) and subsequently carrying out the assembly of the device (100). Moreover, the method provides to provide in said friction element (3) an internal thread (32) shaped so as to be compatible with said thread of the pin (2P) but with thread pitch and/or inclination differentiated with respect to the corresponding values of pitch and inclination of the thread of the pin (2P).

In practice, the details of execution can in any case vary in an equivalent manner as regards the elements described and illustrated, without thereby departing from the scope of the idea of solution adopted and therefore remaining within the limits of the protection conferred by the present patent.

The invention claimed is:

1. A device for mandibular advancement, comprising:
   a tube and
   a telescopic rod associated with the tube, in which the tube and the telescopic rod can be associated with the teeth of the upper and lower arches, in which the telescopic rod comprises a threaded pin which engages a female thread of a hollow element slidably positioned in said tube, and in which the said hollow element comprises a maneuvering portion external to the tube, wherein the device comprises
   a friction element housed inside the maneuvering portion, the friction element being arranged between the internal walls of said maneuvering portion and the thread of the pin, the friction element having an external surface complementarily shaped with respect to the inner walls of said maneuvering portion and a threaded internal cavity which engages the thread of the pin.

2. The device according to claim 1, wherein the internal walls of said maneuvering portion are provided with a groove and said friction element is provided with a corresponding moulding firmly insertable in said groove.

3. The device according to claim 1, wherein the inner walls of said maneuvering portion have a portion with reduced diameter and said friction element has a diameter greater than said reduced diameter.

4. The device according to claim 1, wherein said friction element is made of a material of the group which comprises: plastic material, resin, photo-polymerizable material, self-polymering material, and chemically activatable material.

5. The device according to claim 1, wherein said friction element has an internal thread shaped so as to be compatible with said thread of the pin but with differentiated pitch and/or inclination of the thread with respect to the corresponding pitch and inclination values of the pin thread.

6. A method for manufacturing a device for mandibular advancement comprising, a tube and a telescopic rod associated with the tube, in which the tube and the telescopic rod can be associated with the teeth of the upper and lower arches, in which the telescopic rod comprises a threaded pin which engages a female thread of a hollow element slidably positioned in said tube, and in which said hollow element comprises a maneuvering portion external to the tube, the process comprising: providing a friction element housed inside the maneuvering portion, the friction element being arranged between the inner walls of said maneuvering portion and the thread of the pin, the friction element having an external surface complementarily shaped with respect to the internal walls of said maneuvering portion and a threaded internal cavity which engages the thread of the pin.

7. The method according to claim 6, further comprising using a material of the group which comprises: plastic material, resin, photo-polymerizable material, self-polymerizing material, chemically activatable material.

8. The method according to claim 6, further comprising initially forming the components of the device and said friction element and subsequently carrying out the assembly of the device.

9. The method according to claim 6, wherein an internal thread is formed in said friction element so as to be compatible with said thread of the pin but with pitch and/or inclination of the thread differentiated with respect to the corresponding pitch and inclination values of the thread of the pin.

* * * * *